United States Patent [19]

Carmien

[11] Patent Number: 5,375,486
[45] Date of Patent: Dec. 27, 1994

[54] SURFACE PROTECTIVE STRIKING TOOLS

[76] Inventor: Joseph A. Carmien, 525 N. Maple Dr., Beverly Hills, Calif. 90210

[21] Appl. No.: 167,418

[22] Filed: Dec. 14, 1993

Related U.S. Application Data

[63] Continuation-in-part of Ser. No. 6,127, Jan. 19, 1993, Pat. No. 5,310,230, which is a continuation of Ser. No. 757,670, Nov. 7, 1991, abandoned, which is a continuation-in-part of Ser. No. 712,690, Jun. 10, 1991, Pat. No. 5,123,304.

[51] Int. Cl.5 ................................. B25D 1/10
[52] U.S. Cl. .................................. 81/21; 81/22
[58] Field of Search .................... 81/19, 20, 21, 22

[56] References Cited

U.S. PATENT DOCUMENTS

| | | |
|---|---|---|
| Re. 32,364 | 2/1987 | Carmien . |
| 657,422 | 9/1900 | Judd . |
| 1,374,336 | 4/1921 | Surbaugh . |
| 1,755,236 | 4/1930 | Brandenburg . |
| 2,031,556 | 2/1936 | Brandenburg . |
| 2,052,616 | 9/1936 | Gardes . |
| 2,063,774 | 12/1936 | Washington . |
| 2,238,104 | 4/1941 | Finley . |
| 2,517,902 | 8/1950 | Luebkeman . |
| 2,948,649 | 8/1960 | Pancherz . |
| 3,018,140 | 1/1962 | Portz et al. . |
| 3,232,355 | 2/1966 | Woolworth . |
| 3,549,189 | 12/1970 | Alosi . |
| 3,556,888 | 1/1971 | Goldsworthy . |
| 3,620,159 | 11/1971 | Gould ................ 81/22 X |
| 3,762,453 | 10/1973 | Merrow et al. . |
| 4,039,012 | 8/1977 | Cook . |
| 4,050,727 | 9/1977 | Bonnes . |
| 4,424,183 | 1/1984 | Nelson . |
| 4,451,073 | 5/1984 | Carmien . |
| 4,570,988 | 2/1986 | Carmien . |
| 4,605,254 | 8/1986 | Carmien . |
| 4,639,029 | 1/1987 | Kolonia . |
| 4,697,481 | 10/1987 | Maeda .................... 81/22 |
| 4,743,481 | 5/1988 | Quinlan et al. . |
| 5,123,304 | 6/1992 | Carmien . |
| 5,262,113 | 11/1993 | Carmien . |

FOREIGN PATENT DOCUMENTS

| | | |
|---|---|---|
| 2555-098-A | 5/1985 | France . |
| 129611 | 10/1950 | Sweden . |
| 3424 | of 1882 | United Kingdom ........ 81/19 |
| 1376180 | 12/1974 | United Kingdom . |
| 2093398A | 9/1982 | United Kingdom . |
| PCT/SE84/0-0036 | 2/1984 | WIPO . |

Primary Examiner—James G. Smith
Attorney, Agent, or Firm—Kelly, Bauersfeld & Lowry

[57] ABSTRACT

An improved manufacturing process is provided for surface protective striking tools such as hammers and mallets. An elongate hollow core is fitted with impact heads at opposite ends thereof and filled with a flowable filler material such as small steel pellets prior to placement of the core into a mold cavity for injection mold formation of an outer encasement. During the molding step, the filler material provides a substantially rigid structural backstop which enables a core of lightweight construction to withstand typical injection molding parameters. The molded outer encasement ensheathes a skirt portion of the impact heads and any exposed portion of the core member to bind the impact heads to the core member. The molded outer encasement does not extend over an impact face of each impact head. A handle may also be molded with the outer encasement. A striking tool thus formed is removed from the mold, and some or all of the filler material is drained from the core through an open port. When a handle is provided, a reinforcing rod is inserted centrally within the handle so as to extend the length thereof. The rod may be heated prior to insertion into the handle to help secure the rod in place within the handle.

10 Claims, 3 Drawing Sheets

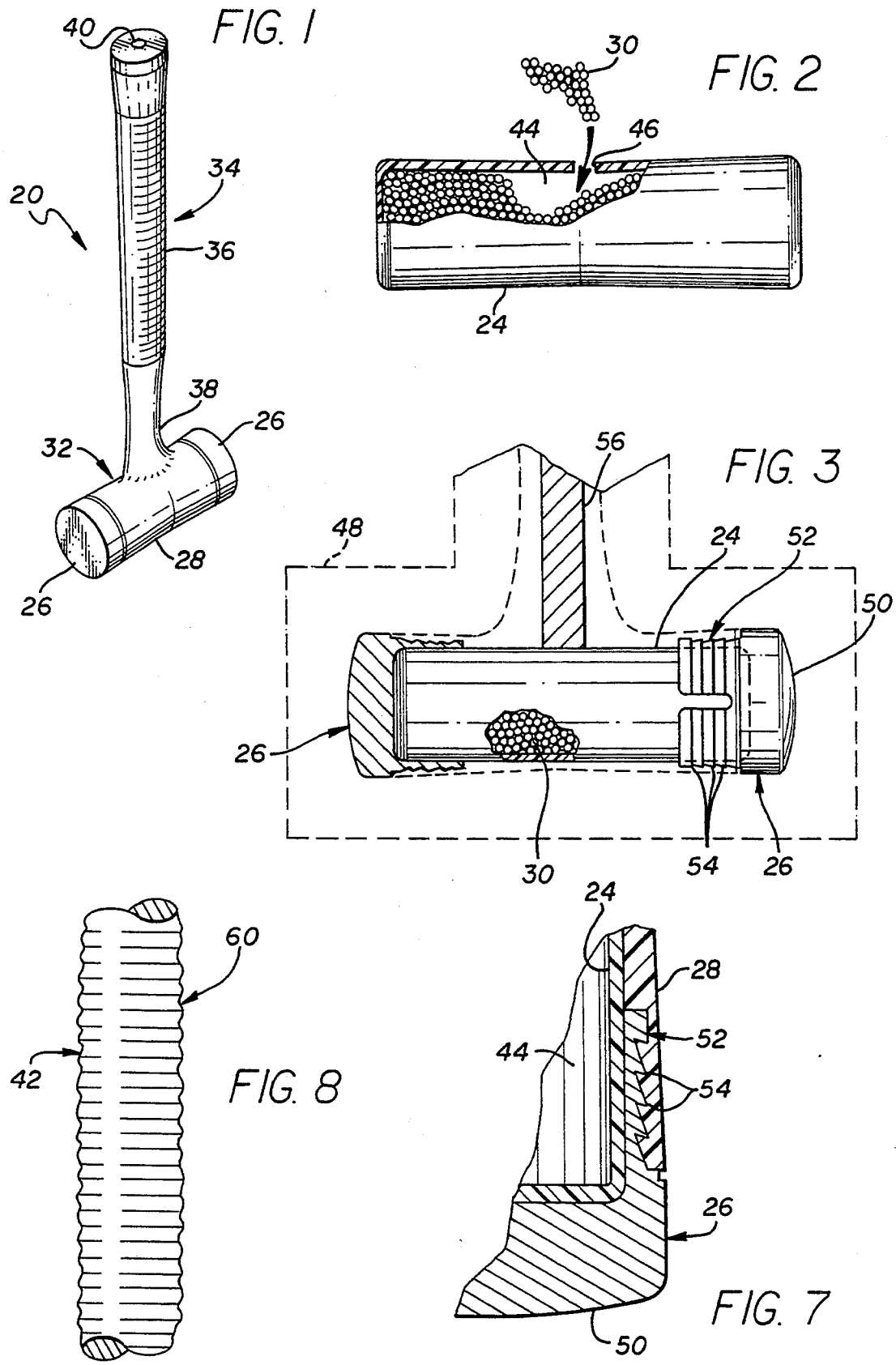

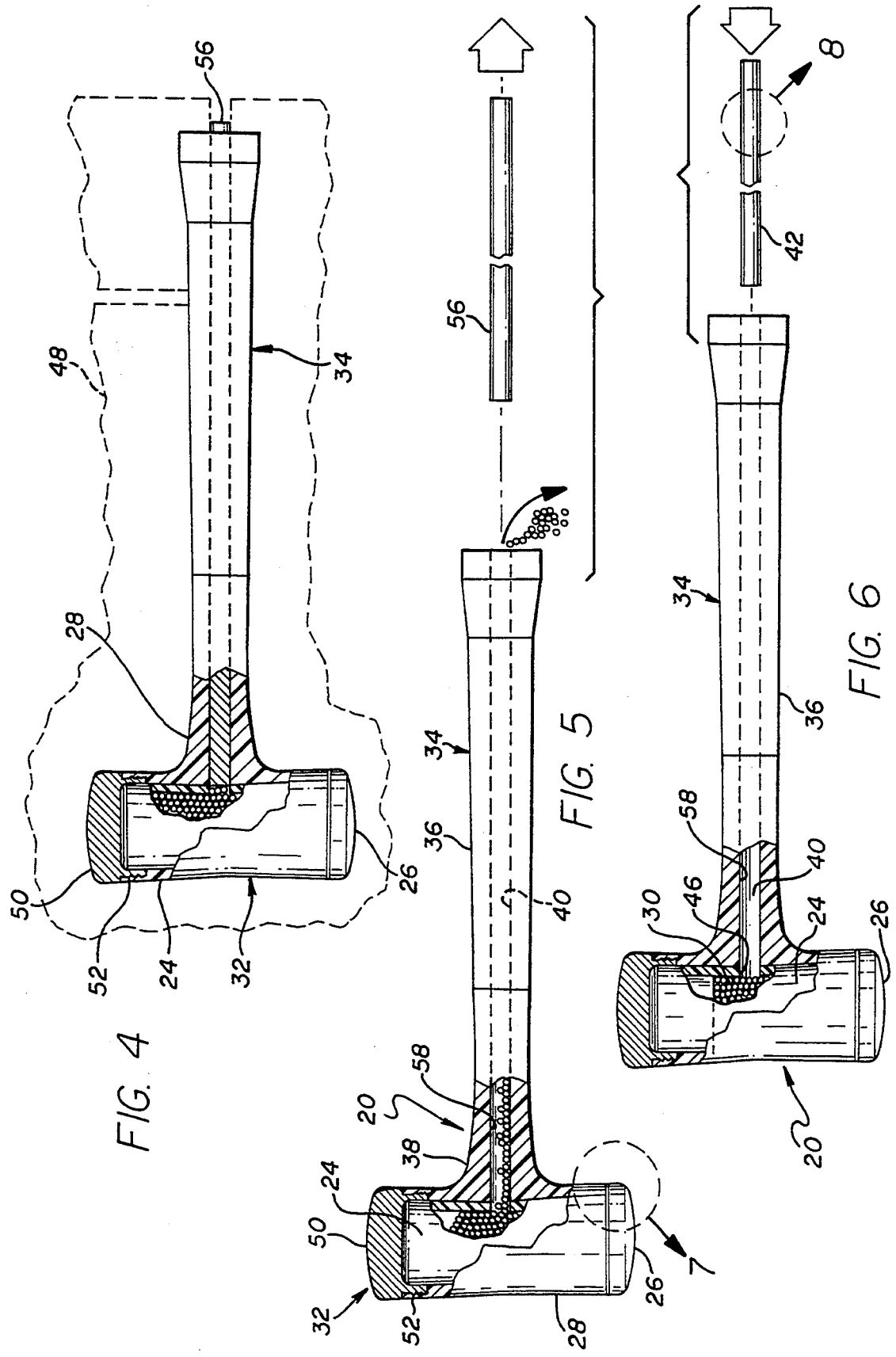

SURFACE PROTECTIVE STRIKING TOOLS

RELATED APPLICATIONS

This application is a continuation-in-part of U.S. Pat. application Ser. No. 08/006,127, filed Jan. 19, 1993, entitled CLOSED BACK SHOVEL AND METHOD OF ASSEMBLY, now U.S. Pat. No. 5,310,230, which is a continuation of U.S. Pat. application Ser. No. 07/757,670, filed Nov. 7, 1991 entitled CLOSED BACK SHOVEL AND METHOD OF ASSEMBLY, now abandoned, which is a continuation-in-part of U.S. patent application Ser. No. 07/712,690, filed Jun. 10, 1991 and entitled PROCESS FOR ATTACHING TOOL HEADS TO ENDS OF COMPOSITE HANDLES, now U.S. Pat. No. 5,123,304.

BACKGROUND OF THE INVENTION

This invention relates generally to hand tools and related manufacturing processes. More particularly, the present invention relates to the manufacture of plastic molded surface protective striking tools, such as hammers and mallets, which permits tool components to be assembled together in a simplified manufacturing process, wherein the components are selected to maximize performance of the striking tool while lowering the costs thereof.

Traditionally, surface protective striking tools, such as soft-faced hammers and mallets, have been manufactured much like other types of striking tools with the exception that the tool head or impact face is made of a material intended to minimize damage to the work being struck. The tool or impact heads have often been made of rawhide, rubber, copper, brass, wood or the like. The particular material chosen for the tool head or impact face has been dependent upon the task to be accomplished.

In the course of time, improvements have been made to the design of traditional surface protective striking tools. For example, surface protective hammers have been devised which utilize a permanent or non-sacrificial handle and head component, and interchangeable and replaceable impact faces which are attachable to a holder provided in the head of the permanent portion of the tool component. Such interchangeable and/or replaceable faces are made of a wide range of materials, and particularly out of new engineering plastics, which often exhibit superior working characteristics, i.e., they are tougher, softer, more cut resistant, etc., than traditional tool heads for surface protective striking tools. Such modern surface protective hand tools which utilize a non-sacrificial holder and replaceable insert faces have become very popular with professional mechanics and tradesmen but, due to their comparatively high cost, such hand tools are not well used by or known to the semi-professional or home mechanic.

Attempts have been made to design and manufacture tool components, including striking tools, in a more efficient manner while retaining the reliability, durability and performance of hand tools manufactured in traditional ways. Specifically, a variety of plastic encased tool components are generally known in the art, wherein a skeletal core member is contained within a resilient outer encasement or cladding of molded plastic material or the like. The tool component is produced by placing the skeletal core member into a mold cavity which is then filled with a selected thermoplastic molding compound under suitable conditions of heat and pressure. The plastic material is permitted to cure, followed by removal of the plastic encased tool component from the mold cavity. Examples of such plastic encased tool components include elongated tool handles, plastic-faced hammers and mallets, etc.

In the production of tool components of this general type, the skeletal core member must have sufficient structural integrity to withstand the pressures and temperatures encountered in a typical injection molding environment. That is, the core member must be able to retain its structural size and shape throughout the injection molding process, to prevent production of defective tool components. In the past, skeletal core members of solid cross-section have been commonly used in the manufacture of plastic encased tool components. However, since the cost of such tool components is primarily attributable to the cost of materials, it is desirable to reduce or minimize the material used in the skeletal core member to the extent possible without sacrificing the requisite strength. In this regard, reduction in the cross-sectional size of a solid core member is ineffective to reduce material costs, since additional molded plastic encasement material is required to form the finished tool component.

Hollow skeletal core structures have been proposed for use in the manufacture of plastic encased tool components. A hollow member beneficially reduces the material cost in the finished tool component without requiring the use of additional molded plastic encasement material. Moreover, a hollow skeletal core reduces the weight of the finished tool component, resulting in a lightweight tool product which can be especially desirable in certain applications. However, despite the hollow construction of the skeletal core member, a substantial amount of core member material has still been required in order to provide the core member with the necessary structural integrity to withstand injection molding processes.

There exists, therefore, a need for improvements in manufacturing processes for making plastic encased tool components, wherein a hollow core member constructed from substantially minimum material quantities is contained within a resilient outer encasement of molded thermoplastic material or the like. Additionally, there is a need for specialty striking tools, such as surface protective hammers and mallets, which are highly versatile in regard to the material utilized on the impact surface, which retain the reliability, durability and performance characteristics of similar striking tools manufactured in traditional ways, and which have a substantially lower cost of manufacture than such traditional striking tools. Additionally, a need exists for such striking tools which may include a no-bounce feature, without materially increasing costs. The present invention fulfills these needs and provides further related advantages.

SUMMARY OF THE INVENTION

The present invention resides in improved surface protective striking tools and related manufacturing processes. In one preferred form of the invention, the striking tool comprises an elongate hollow core member and a pair of impact heads each having an impact face and a skirt extending away from the impact face. The skirt of each impact head is fitted over a respective end of the hollow core member, and a molded outer encasement ensheathes the skirts and any exposed portion of the core member therebetween. The molded outer encasement binds the impact heads to the hollow core member leaving the impact faces exposed. The skirt of each impact head includes surface irregularities to facilitate attachment of the molded outer encasement thereto. An access port is provided through both the hollow core member and the molded outer encasement through which a flowable filler material may be added to or removed from the hollow core member.

In another preferred form of the invention, a handle is formed integrally with the molded outer encasement, which extends away from the hollow core member generally perpendicularly with respect to a longitudinal axis thereof. The access port extends generally centrally through the handle, and is plugged by a reinforcing rod disposed within the handle. The reinforcing rod provides stiffness and strength to the handle which might be unavailable if the most economical plastic material were utilized for the molded outer encasement. The reinforcing rod includes an irregular outer surface which facilitates securing the reinforcing rod within the handle.

The present invention also concerns a manufacturing process for making such surface protective striking tools. In accordance with the method, a core member is provided which defines a hollow interior space and an access port opening into the interior space. The interior space of the core member is filled with a flow able filler material, and then the access port is closed to retain the filler material within the interior space. An impact head having an impact face a skirt extending away therefrom, is placed adjacent to one end of the core member such that said one end of the core member is disposed within the skirt. The core member with the filler material therein and the impact head thereon is placed into a mold cavity, and then a plastic material is injected into the mold cavity to form a resilient outer encasement on the core member and the skirt of the impact head. The plastic material is allowed to cure to form the striking tool, after which the striking tool is removed from the mold cavity. The access port in the core member may then be opened to remove at least a portion of the filler material from the interior space. The method of the present invention may further include the step of forming a handle for the striking tool during the molding step.

The filler material typically comprises solid pellets having a diametric size on the order of 0.005 inch. The method may include the step of re-closing the access port after a limited portion of the filler material has been removed from the core member to retain a residual portion of the filler material therein. This provides the resultant striking tool with deadblow or nonrecoil characteristics.

When a handle is formed during the molding step, the step of re-closing the access port includes the steps of inserting a reinforcing rod into the handle so as to be disposed generally centrally therein and extending the length thereof. The reinforcing rod is provided with surface irregularities, and is preferably heated prior to inserting it into the handle such that upon insertion of the reinforcing rod, an interior surface of the handle is softened and flows into contact with the surface irregularities of the reinforcing rod to help secure it within the handle.

A second impact head having a second impact face and a second skirt extending away from the second impact face, may be placed adjacent to a second end of the core member prior to the molding step. In this case, the molding step binds both impact heads to the core member.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a surface protective hammer manufactured in accordance with the present invention;

FIG. 2 is a front elevational view, shown partially in vertical section, illustrating the step of filling an elongate hollow core member with a flowable filler material in accordance with the manufacturing process of the invention;

FIG. 3 is a front elevational view, shown partially in vertical section, illustrating the hollow core member having impact heads placed over each end and placed within an injection mold, wherein a removable core pin extends away from the hollow core member generally perpendicularly relative to its longitudinal axis in alignment with that portion of the mold for forming a handle, wherein the core pin effectively plugs an access port to the hollow core member;

FIG. 4 is a front elevational view, shown partially in vertical section, illustrating the assembled core member and impact heads of FIG. 3 within the injection mold, with a molded plastic outer encasement formed thereon;

FIG. 5 is a front elevational view, shown partially in vertical section, similar to FIG. 4, and illustrating removal of the core pin from the handle, and removal of a portion of the filler material from the hollow core member;

FIG. 6 is a front elevational view similar to FIG. 5, illustrating insertion of a reinforcing rod generally centrally within the handle which, when inserted, closes the access port;

FIG. 7 is an enlarged, fragmented elevational section taken generally of the area indicated by the number 7 in FIG. 5, illustrating the manner in which the impact heads ensheathe a respective end of the hollow core member, and further illustrating the manner in which the molded plastic outer encasement ensheathes a skirt portion of each impact head and adjacent portions of the hollow core member to secure the impact heads to the core member;

FIG. 8 is an enlarged fragmented elevational view taken generally of the area indicated by the number 8 in FIG. 6, illustrating surface irregularities provided the reinforcing bar to facilitate securement of the reinforcing bar within the handle;

DETAILED DESCRIPTION OF THE PREFERRED EMBODIMENTS

Figure 9:
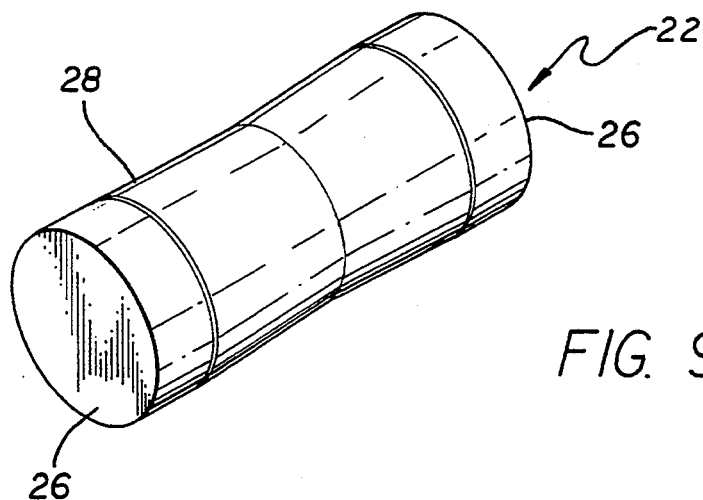
FIG. 9 is a perspective view similar to FIG. 1, illustrating another type of surface protective striking tool manufactured in accordance with the present invention.
Figure 10:
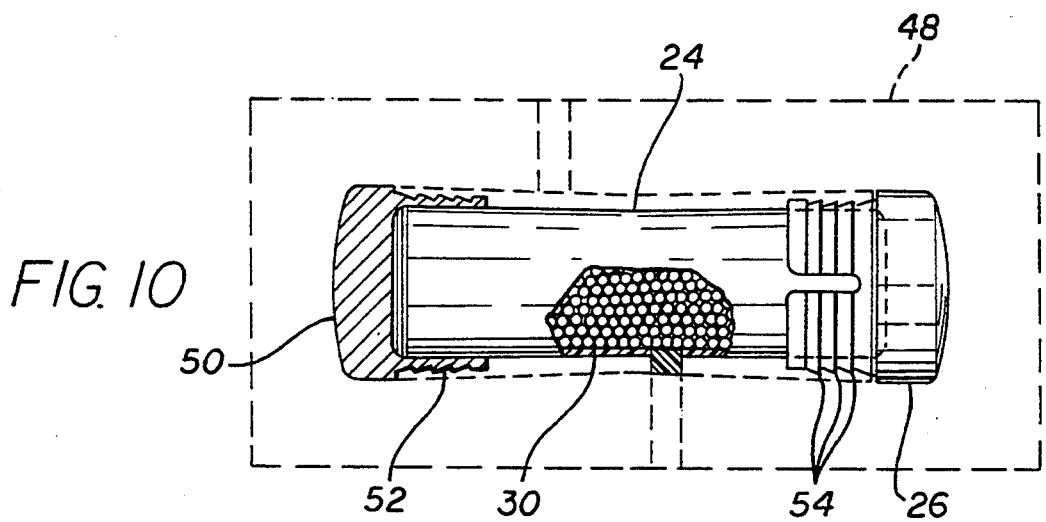
FIG. 10 is a front elevational view, shown partially in vertical section, illustrating the elongate hollow core member having impact heads disposed at each end thereof, of the striking tool of FIG. 9, within an injection mold.
Figure 11:
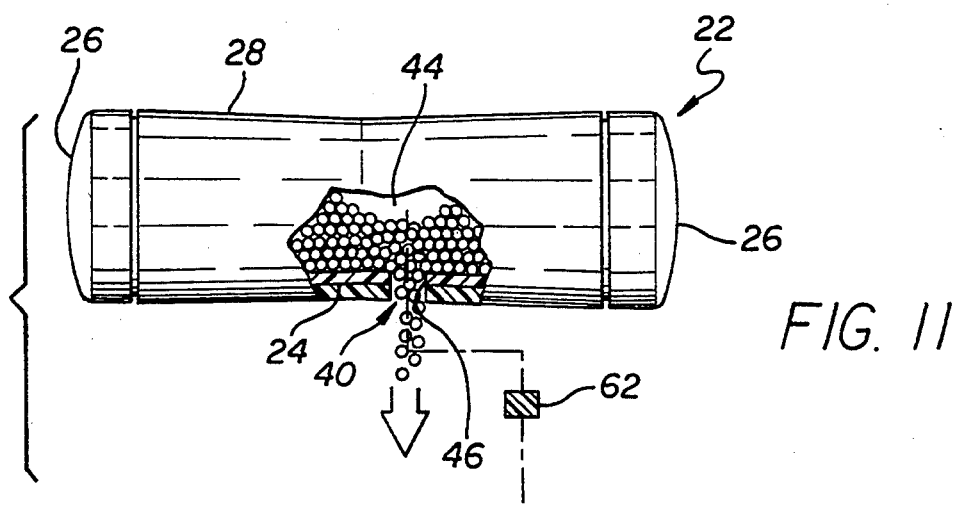
FIG. 11 is a front elevational view, shown partially in vertical section, of the striking tool of FIGS. 9 and 10, illustrating removal of a portion of the filler material from the hollow core member after a molded plastic outer encasement is formed to secure the impact heads to the core member.

As shown in the drawings for purposes of illustration, the present invention is concerned with the manufacture of surface protective striking tools. FIGS. 1-8 illustrate the construction and manufacture of a hammer 20 embodying the present invention, and FIGS. 9-11 illustrate a "handleless mallet" 22 likewise embodying the invention. Both striking tools 20 and 22 include a lightweight hollow core 24 having a pair of impact heads 26 fitted over the ends of the core, and a molded outer cladding or encasement 28 which ensheathes portions of the impact heads and the hollow core to bind them together. During formation of the outer encasement 28, the hollow core 24 is substantially filled and structurally backstopped by a flowable filler material 30 to enable the otherwise lightweight core 24 to withstand injection molding pressure and temperature conditions.

The present invention permits use of a hollow core 24 constructed from a minimum mass of lightweight material, such as a molded or extruded plastic tubular shell, wherein the hollow core may be constructed with inadequate structural strength and rigidity to withstand compressive pressures, etc., applied thereto in the course of injection molding processes to form the outer encasement 28. More particularly, the hollow core 24 defines a generally tubular or cylindrical thin-walled structure with an open interior volume. During injection molding, this interior volume is substantially completely filled by the filler material 30, selected to provide a rigid structural backstop which reinforces and retains the shape integrity of the core 24. The filler material 30 is adapted for removal, in whole or in part, from the hollow core 24 of the striking tool 20 or 22 subsequent to molded formation of the outer encasement 28, thereby providing a lightweight tool component constructed from a comparative minimum of constituent materials.

With reference to FIGS. 1-8, the hammer 20 is of the soft-face, deadblow variety and includes, generally, a hammer head 32 and a handle 34 which provides a grip 36, and which extends from the hammer head at a neck portion 38. In this embodiment, the head 32 includes the lightweight hollow core 24 filled with the flowable filler material 30 and supporting a pair of impact head s 2 6 on opposite ends. The molded cladding or encasement 28 also forms the handle 34 during the molding process. Some or all of the filler material 30 is removable from the hollow core 24 through an access port 40 sub sequent to formation of the encasement 28. In one form, a portion of the filler material 30 remains within the head 32 to provide the hammer 20 with so-called deadblow or nonrecoil characteristics. A reinforcing bar 42 is inserted into the handle 34 so as be disposed generally centrally therein and extending the length thereof. The reinforcing bar 42, when so positioned, also closes the access port 40.

More particularly, as shown in FIG. 2 the hollow core member 24 is generally cylindrical and defines an interior chamber 44. An aperture 46 is provided in the hollow core 24 which forms a portion of the access port 40, and allows for the introduction of flow able filler material 30.

Prior to placing the filled core 24 within an injection mold 48, two impact heads 26 are fitted over the ends of the core. Each of the impact heads 26 include an impact face 50 and a skirt 52 which extends away from the impact face. The skirt 52 and the impact face 50 cooperatively define an open-sided, generally cylindrical internal chamber into which an end of the core 24 is snugly received. The skirt 52 is further provided with a series of beads or rings 54 on the external surface thereof, to facilitate securing the impact heads 26 to the hollow core 24 by the molded plastic encasement 28 following the molding process (FIG. 7).

The assembled core 24 and impact heads 26 are placed within the injection mold 48, as shown in FIG. 3. An elongate core pin 56 is positioned with one end placed either over or within the aperture 46, to extend from the hollow core 24 as a skeletal member for the hammer handle 34. As shown in FIG. 4, plastic encasement material is introduced into the mold 48 under suitable injection molding conditions to form an integral cladding which ensheathes the skirts 52 of the impact heads 26 as well as an intermediate portion of the hollow core 24, and also forms the hammer handle 34 about the core pin 56. The encasement material is permitted to cure, thereby defining the plastic molded encasement 28.

The resultant hammer is separated from the mold 48, and the core pin 56 is withdrawn from the molded plastic handle 34 to open the now formed access port 40, which includes an elongated channel 58 extending generally centrally the length of the handle 34, and the aperture 46 with which the channel 58 is aligned (FIG. 11). Some or all of the filler material 30 can be drained from the hollow core 24 to provide a lightweight hammer head 32. In a preferred form, a portion (approximately ⅔ to ¾) of the filler material 30 is retained within the hammer head 32, and the access port 40 is plugged and sealed by means of a fiberglass shaft or reinforcing bar 42 which is press-fit into the channel 58 (FIG. 6). In this regard, the fiberglass reinforcing bar 42 is provided with external surface irregularities 60 (FIG. 8) and is preferably heated prior to being driven into the channel 58. The heated reinforcing bar 42 has a diameter slightly larger than the diameter of the channel 58 such that as it is driven into the thermoplastic encasement 28 defining the handle 34, the thermoplastic material defining the channel 58 is softened and flows into intimate contact around the surface irregularities 60 and then hardens as the heat of the reinforcing bar 42 is dissipated. This serves to securely hold the reinforcing bar 42 in place within the channel 58.

The reinforcing bar 42 advantageously minimizes any warping or cold-flowing deformation of the handle 34 during use, and significantly strengthens the handle so that the hammer 20 may be used effectively as a striking tool. The core pin 56 and the filler material 30 removed from the handle 34 and the hammer head 32 may be reused.

FIGS. 9-11 illustrate the manufacture of a mallet-like striking tool 22, which is identical in virtually every respect to the hammer 20 described above, with the exception that no handle 34 is provided. The same reference numbering system utilized in connection with the hammer 20 will be utilized in the description of the mallet 22 for consistency of identification of similar tool components.

In this embodiment, the mallet 22 includes a lightweight core 24 filled with the flow able filler material 30 and having a pair of impact heads 26 fitted over the opposite ends thereof. When placed into the injection mold 48, a plug 62 for the aperture 46 extends therefrom to create a short channel 58 through the plastic molded encasement 28 following the injection molding process. Again, the channel 58 and the aperture 46 define the access port 40 through which some or all of the filler material 30 can be drained from the hollow core 24 (FIG. 11). The mallet 22 is, essentially, the hammer head 32 manufactured without the handle 34 of the embodiment described above. The plastic molded encasement 28 generally ensheathes the skirts 52 and the intermediate portion of the hollow core 24, while leaving the impact faces 50 exposed.

From the foregoing it will be appreciated that striking tools manufactured in accordance with the present invention utilize interchangeable components which may be selected to design a custom hand tool for a specific working environment, which hand tool may be made of the most economical materials. In the striking tools 20 and 22 illustrated, more expensive high strength materials are utilized only where they will be needed. The impact heads may be selected from a wide variety of materials, for example nylon, polyurethane, and soft vinyls, that provide a wide range of working characteristics, from relatively hard impact face surfaces to very soft. The use of adhesives or screw or rivet-type mechanical locking of the impact heads 26 to the hammer head 32 has been eliminated to improve reliable manufacture of the striking tools. The deadblow characteristics, if desired, can be closely regulated by the amount of flowable filler material 30 retained within the hollow core 24 following the molding process. Moreover, the reinforcing bar 42 provides significant strength enhancement to the handle 34.

The present invention further provides an improved method for making plastic encased tool components having a lightweight hollow core, wherein the hollow core is structurally backstopped and reinforced by the flowable filler material 30 during injection molding. Subsequent to injection molding of the outer encasement 28, some or all of the filler material 30 can be removed quickly and easily from the core to provide a lightweight and relatively low cost tool component.

A variety of further modifications and improvements to the invention described herein will be apparent to those skilled in the art. Accordingly, no limitation on the invention is intended by way of the foregoing description and accompanying drawings, except as set forth in the appended claims.

I claim:
1. A striking tool, comprising:
an elongate hollow core member;
a flowable filler material disposed within the hollow core member;
a first impact head having a first impact face and a first skirt extending away from the first impact face, the first skirt being fitted over a first end of the hollow core member;
a second impact head having a second impact face and a second skirt extending away from the second impact face, the second skirt being fitted over a second end of the hollow core member;
a molded outer encasement ensheathing the first and second skirts and any exposed portion of the core member therebetween, the molded outer encasement binding the first and second impact heads to the hollow core member and leaving the first and second impact faces exposed; and
an access port through both the hollow core member and the molded outer encasement, through which the flowable filler material may be added to or removed from the hollow core member.

2. A striking tool as set forth in claim 1, wherein the first and second skirts each include surface irregularities to facilitate attachment of the molded outer encasement thereto.

3. A striking tool as set forth in claim 1, wherein the molded outer encasement includes a handle.

4. A striking tool as set forth in claim 3, including a reinforcing rod disposed within the handle and extending the length thereof.

5. A striking tool as set forth in claim 4, wherein the reinforcing rod includes an irregular outer surface which facilitates securing the reinforcing rod within the handle.

6. A striking tool, comprising:
an elongate hollow core member;
a flowable filler material disposed within the hollow core member;
an impact head having an impact face and a skirt extending away from the impact face, the skirt being fitted over one end of the hollow core member;
a molded outer encasement ensheathing the skirt and the hollow core member such that the molded outer encasement binds the impact head to the hollow core member while leaving impact face exposed;
a handle extending away from the hollow core member generally perpendicularly with respect to a longitudinal axis thereof, the handle being formed integrally with the molded outer encasement;
a reinforcing rod disposed within the handle and extending the length thereof; and
an access port through both the hollow core member and the molded outer encasement, through which the flowable filler material may be added to or removed from the hollow core member, the access port being plugged by the reinforcing rod when disposed within the handle.

7. A striking tool as set forth in claim 6, wherein the reinforcing rod includes an irregular outer surface which facilitates securing the reinforcing rod within the handle.

8. A striking tool as set forth in claim 6, wherein the skirt includes surface irregularities to facilitate attachment of the molded outer encasement thereto.

9. A striking tool as set forth in claim 8, including a second impact head having a second impact face and a second skirt extending away from the second impact face, wherein the second skirt is placed over a second end of the hollow core member such that the molded outer encasement binds the second impact head to the hollow core member.

10. A striking tool, comprising:
an elongate hollow core member;
a flowable filler material disposed within the hollow core member;
an impact head having an impact face and a skirt extending away from the impact face, the skirt being fitted over one end of the hollow core member;
a molded outer encasement ensheathing the skirt and the hollow core member such that the molded outer encasement binds the impact head to the hollow core member while leaving the impact face exposed; and
an access port through both the hollow core member and the molded outer encasement, through which the flowable filler material may be added to or removed from the hollow core member.

* * * * *